(No Model.)
C. E. DUNLAP.
IMPLEMENT FOR COOKING FRIED CAKES.
No. 536,986. Patented Apr. 2, 1895.
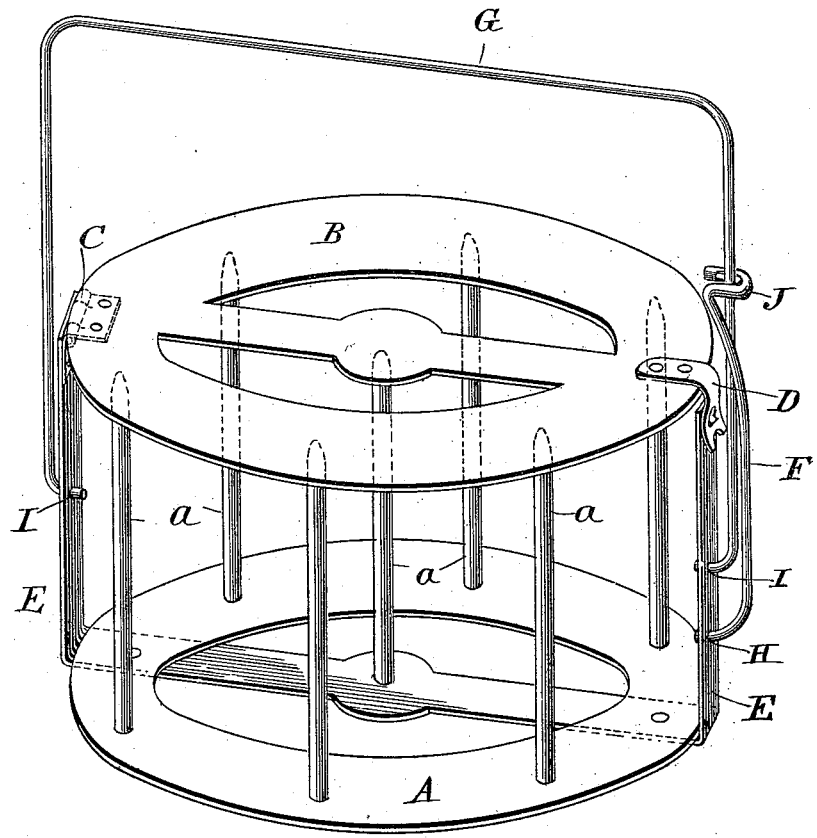
Witnesses:
Ellen E. Dunlap.
Agnes A. Anderson.
Inventor.
Celia E. Dunlap.

UNITED STATES PATENT OFFICE.

CELIA E. DUNLAP, OF MANISTEE, MICHIGAN.

IMPLEMENT FOR COOKING FRIED CAKES.

SPECIFICATION forming part of Letters Patent No. 536,986, dated April 2, 1895.

Application filed November 19, 1894. Serial No. 529,386. (No model.)

*To all whom it may concern:*

Be it known that I, CELIA E. DUNLAP, a citizen of the United States, residing at the city of Manistee, county of Manistee, and State of Michigan, have invented a new and useful Implement for Cooking Fried Cakes, of which the following is a specification.

It is designed to save time and labor in the cooking of fried cakes, and to avoid the necessity of being constantly near a hot range or stove, during the process of cooking.

The drawing illustrates a perspective view of my device.

It is constructed with two corresponding upper and lower round plates, A and B, far enough apart to allow the fried cakes to rise, sufficiently perforated or open to admit of their being readily immersed in liquid fat.

The lower plate "A" is provided with two ribs, "E. E.," one on each side extending upward to the upper plate or lid to which the latter is attached by a hinge, "C," on one side and a catch "D" on the other, to open and shut.

To the upper side of the lower plate are secured perpendicular spindles, *a*, extending to the lid, upon which are placed the fried cakes. The spindles are placed far enough apart to allow the fried cakes to rise and float freely without crowding each other. There may be any number of these spindles according to the size of the utensil desired.

The implement has a bail, "G," attached to either side at, "I. I," near the center of gravity upon which it may rotate.

An operating handle, "F," is provided for reversing the cooker to turn the fried cakes during the progress of the cooking. The lower end of this handle or rod is connected by a pin to one of the ribs on the side at, "H," some distance below the bail connection and the center of gravity. The upper end of the rod is provided with a clasp, "J" which may be placed upon the side of the bail when erect, to hold the machine, bail and handle in position. It locks the implement when either side is up.

This implement is intended to be used with a small as well as a large quantity of fat, and with the fried cakes either immersed under or floating on the top, and therefore it is not necessary to regulate the quantity. If the liquid is shallow in the receiving vessel the cakes will rise and float held in place by the spindles, and may be turned by lifting and reversing the implement to cook the other side.

What I claim as my invention, to be protected by patent, is—

1. In an implement for cooking fried cakes, two perforated plates, "A" and "B," locked together, the lower plate, "A" provided with spindles to receive the fried cakes and keep them in place, supported by a bail, "G," attached near the center of gravity at "I. I," all substantially as set forth.

2. An operating handle, "F," with the lower end connected with the side at "H," below the bail connection, and the upper end provided with a clasp "J" which may be placed upon the side of the bail at "K" for the purpose of reversing and locking the implement.

CELIA E. DUNLAP.

Witnesses:
AGNES ANDERSON,
F. W. DUNLAP.